July 25, 1961 H. SURTEES ET AL 2,993,666
FLIGHT CONTROL MECHANISMS FOR AIRCRAFT
Filed Jan. 28, 1959
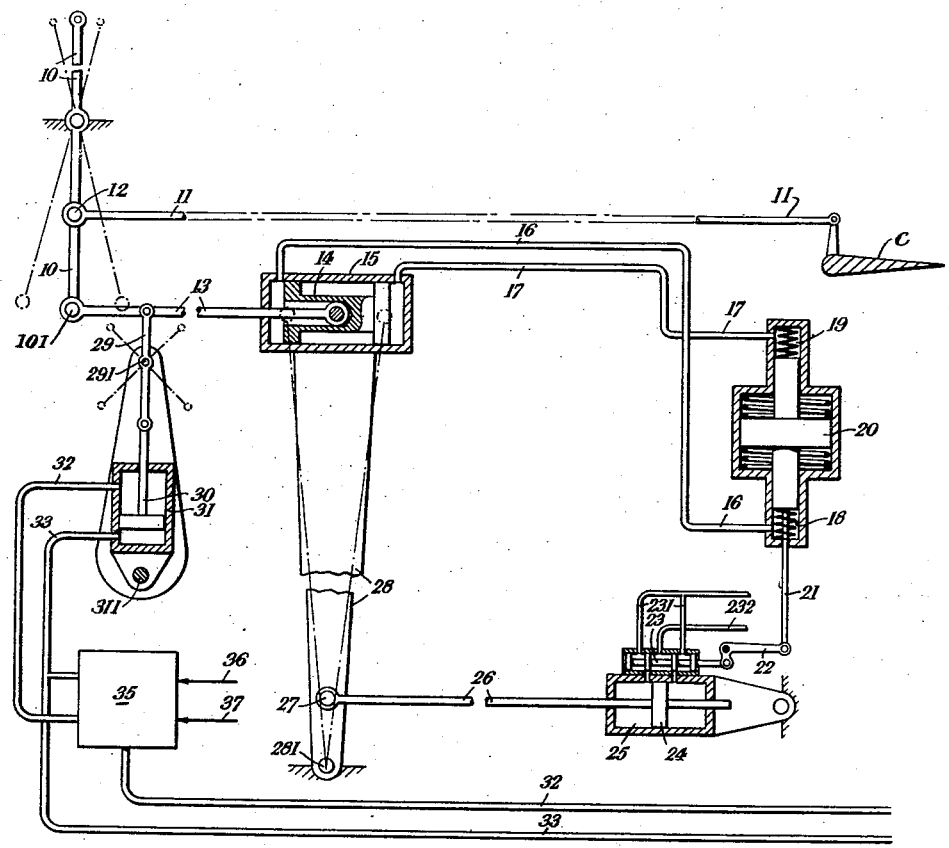
Inventors:
Howard Surtees
John Irvine Rattey
William James Redstone
By Moses, Nolte & Nolte
attorneys

United States Patent Office 2,993,666
Patented July 25, 1961

2,993,666
FLIGHT CONTROL MECHANISMS FOR AIRCRAFT
Howard Surtees, Twickenham, John L. Lattey, Shepperton, and William J. Redstone, Surrey, England, assignors to Vickers-Armstrongs (Aircraft) Limited, London, England
Filed Jan. 28, 1959, Ser. No. 789,628
Claims priority, application Great Britain Feb. 4, 1958
11 Claims. (Cl. 244—78)

The invention relates to flight control mechanisms for aircraft, particularly high speed aircraft in which the aerodynamic forces on the flight control member, e.g. control column, are subject to widely varying parameters, such as air speed, weight of the aircraft, and the position of the centre-of-gravity of the aircraft, and in which the effort which must be exerted upon the control organs to produce a given acceleration in pitch may vary widely. It is nevertheless highly desirable that the force which is applied to the control members actuating these control organs for the purpose of effecting a manoeuvre of this kind, and which is sometimes referred to as the "stick force per g," should be substantially constant, whatever the magnitude of the aerodynamic forces on said organs, and the object of the invention is to provide means which will satisfy this condition.

Accordingly, the invention provides in or for an aircraft flight control mechanism comprising flight control members and flight control organs responsive to the control movements thereof, servo-control means for applying to the control members a force which is proportional to the pitching acceleration of the aircraft, and which is applied in a direction tending to restore the said acceleration to a predetermined value.

According to the invention an aircraft may comprise a flight control member, a flight control organ responsive to the movements of said member for directional control of the aircraft in a plane normal to the longitudinal axis thereof, an accelerometer located preferably at or forward of the centre-of-gravity of the aircraft so as to be sensitive to accelerations in pitch, and means by which the force measured by said accelerometer is compared with the force applied to said control member to produce said acceleration, and means for utilizing the difference between such two forces to effect appropriate movement of the control organ to counteract or reduce such acceleration.

Alternatively, the invention provides flight control apparatus for an aircraft, comprising a flight control organ for directional control of the aircraft in a plane normal to the longitudinal axis thereof, a feel simulator jack responsive to dynamic pressure variations operatively associated (a) with said normal control member, and (b) with a servo-actuated member responsive to forces exerted by an accelerometer sensitive to accelerations in pitch, said forces being proportional to the ensuing accelerations, the arrangement being such the force reacted at the manual control member is represented by the algebraic sum of the force due to the accelerometer and the force applied by the simulator jack.

The invention may be applied to aircraft having either manually operated or power-assisted control members, and in the latter case the apparatus provided in accordance with this invention may be integrated with the power assistance mechanism. The servo-control means may comprise an accelerometer located preferably at or forward of the centre of gravity of the aircraft, and which the measured force is compared automatically with the force applied to the control members, the difference between such two forces being utilised to effect movement of the appropriate control organs. If, for example, the latter force is greater, then the pitching acceleration of the aircraft will be increased until the forces are equal, whereas if the force measured by the accelerometer is greater, then the pitching acceleration is decreased until the forces are once more equal. If the predetermined acceleration to which the servo control tends to restore the aircraft is zero, and if no force is applied to the control member, the aircraft will be automatically controlled by the apparatus to follow a flight path in which no pitching acceleration occurs above that due to gravity.

One embodiment of the invention is illustrated diagrammatically in the accompanying drawing, in which the pilot's control column is indicated by the reference numeral 10 and the member connecting said control column 10 to the pitching control organ C, e.g. an elevator surface, by the numeral 11, said connection 11 being pivoted to the column 10 at 12.

At its lower extremity 101 the control column 10 is connected by the link 13 to the piston 14 of a hydraulic force-transducer of which the cylinder is shown at 15. Pipes 16, 17 connect the ends of said transducer cylinder 15 respectively to cylinders 18, 19 at the opposite ends of a vertical accelerometer located preferably at or forward of the centre-of-gravity of the aircraft. Said accelerometer comprises a spring-balanced mass-weighted piston 20 which is connected through the reducing linkage comprising the rod 21 and the bell-crank lever 22 to the valve 23 of a servo-motor having a piston 24 working in a cylinder 25; fluid-pressure supply and discharge connections to said valve 23 are shown at 231, 232, respectively.

The piston 24 of said servo-motor is connected by a rod 26 to a pivot point 27 on a lever 28, which is pivoted on the airframe at 281 and upon which is carried the cylinder 15 of the transducer 14, 15, thus constituting a feed-back arrangement ensuring that an operational movement imparted by said transducer to the control column 10 is duly terminated when the required pitching acceleration has been achieved.

The link 13 is also connected to a lever 29, which is pivoted on the frame at 291, and which is coupled to the piston rod 30 of a feel simulator jack 30, 31, of which the cylinder 31 is pivotally mounted on the frame at 311. Said jack is included in a hydraulic circuit fed by supply and discharge fluid-pressure ducts 32, 33 respectively, and incorporating a feel simulator control unit 35 having static air pressure and Pitot pressure inputs 36, 37, and by which a pressure proportional to the dynamic air pressure may be applied through the jack 30, 31 to the control column 10.

A pressure difference, created in the transducer cylinder 15 by the application by the pilot of a force to the column 10, is transmitted through the pipes 16, 17 to the accelerometer 18, 19, 20. The resultant movement of the accelerometer piston 20 operates the servo-motor valve 23 so as to admit fluid-pressure to the cylinder 25, such that the lever 28, together with the transducer cylinder 15, are moved in the direction required to operate the elevator control to obtain the desired acceleration.

As the elevator control 11 is moved, the feel simulator jack 30, 31 is caused to move, thereby applying an opposing force, due to the reaction of the feel simulator unit 30, 31, to the control column 10, and effecting a reduction in the pressure difference in the transducer 14, 15. The movement of the elevator control 11 will bring about the required vertical acceleration of the aircraft, causing the accelerometer 18, 19, 20 to oppose the original pressure difference set up by the transducer 14, 15 and tending to close the servo-motor valve 23, so that the rate of movement of the lever 28 is reduced.

The reactive force due to the feel simulator jack 30, 31 is applied to said link 13 in such manner that the pressure difference at the transducer 14, 15, which is transmitted to the accelerometer 18, 19, 20, arised from the difference between the force applied by the pilot to the column 10 and the opposing feel force applied by the simulator jack 30, 31.

The effect upon the accelerometer of said force transmitted from the transducer 14, 15 is to operate the servo-motor 24, 25 and thereby induce a movement of the lever 28, bringing about a displacement of the elevator and causing a pitching acceleration. The accelerometer mass 20 responds in opposition to the pressure difference due to the force exerted by the pilot on the column 10, and tends to restore the valve 23 to the central position and thus to arrest the servo-motor 24, 25. Thus, when the apparatus reaches a steady state condition, the acceleration experienced by the accelerometer 18, 19, 20 will balance the pressure difference at the transducer 14, 15 resulting from the difference between the loads imposed on the column 10 by the pilot and the feel simulator jack 30, 31.

Accelerations such as those due to sudden gusts, call forth the response of the accelerometer mass 20, the movement of which causes the servo-motor 24, 25 to operate the column 28 and thereby apply to the elevator control 11 a force such as will move the elevator in opposition to the acceleration. The pressure difference on the accelerometer 18, 19, 20 will cause the column 10 to move until it is balanced by the force due to the feel simulator jack 30, 31. The pilot should not oppose this movement, since any restraining force which he may apply will tend to maintain the unwanted acceleration. The column 28 will be restored to its central position by the jack 30, 31 as the acceleration dies out.

Having described a specific embodiment of the invention, it should be understood that alternative embodiments and structures may be employed without departing from the spirit and scope of the invention which are defined in the following claims.

What we claim as our invention and desire to secure by Letters Patent is:

1. Flight control apparatus for aircraft comprising a flight control member, a flight control organ, means for representing the force applied to the control member as a hydraulic pressure, a differential pressure measuring device for producing an output representative of the difference between said hydraulic pressure and a pressure developed as a result of and in proportion to pitching acceleration of the aircraft, a servo mechanism having an output member connected to apply a force to said control member in response to variations of an input thereof controlled by the output of the pressure measuring device in such a sense as to reduce said pitching acceleration.

2. Apparatus according to claim 1, wherein said differential pressure measuring device comprises a piston and cylinder assembly, means for applying said hydraulic pressure to the fluid in the cylinder to act on the said piston, said assembly being so mounted that the piston is acted upon by forces due to pitching acceleration, and wherein the piston is connected to the input of the servo-mechanism.

3. Apparatus according to claim 1, wherein said means for representing the force applied to the control member as a hydraulic pressure comprises a hydraulic transducer including a first element slidable within a second element forming part of a hydraulic circuit, and wherein one of said elements is connected to be moved by the control member.

4. Apparatus according to claim 3, wherein the other of said elements is connected to be moved by the output member of the servo-mechanism.

5. Apparatus according to claim 4, wherein the said other of the elements is carried by a lever arranged for pivotal movement and coupled to the output member of the servo-mechanism.

6. Apparatus according to claim 4, wherein the said other of the elements is carried directly by the output member of the servo-mechanism.

7. Apparatus according to claim 4, wherein the first element is a piston connected to the control member and the second element is a cylinder connected to the servo-mechanism output member.

8. Apparatus according to claim 4, wherein said means for representing the force applied to the control member has a hydraulic pressure comprises a hydraulic flexible bellows or bag connected to the control member, and wherein a further flexible bellows or bag is connected to the servo-mechanism.

9. Apparatus according to claim 1, wherein the means for representing the force applied to the control member as a hydraulic pressure comprises a hydraulic transducer arranged to develop differential pressures in a hydraulic circuit, wherein said differential pressure measuring device comprises a piston and cylinder assembly, wherein said hydraulic circuit is connected to apply said differential pressures to opposite ends of the cylinder of said assembly, wherein said assembly is so mounted that the piston is acted on by forces due to pitching acceleration, and wherein the piston of the assembly is connected to the input of the servo-mechanism.

10. Apparatus according to claim 1, including a feel simulator jack responsive to dynamic pressure variations and connected to apply a controlling force to said control member.

11. Apparatus according to claim 10, wherein the simulator jack is connected to the control member so that the force reacted at the said control member is the algebraic sum of the forces applied by the jack and the forces applied by the servo-mechanism.

References Cited in the file of this patent

UNITED STATES PATENTS

| 2,222,886 | Voight | Nov. 26, 1940 |
| 2,487,793 | Esval et al. | Nov. 15, 1949 |
| 2,604,613 | Klass | July 22, 1952 |
| 2,630,284 | Feeney | Mar. 3, 1953 |
| 2,770,429 | Schuck et al. | Nov. 13, 1956 |
| 2,783,006 | Greenland et al. | Feb. 26, 1957 |

FOREIGN PATENTS

| 777,938 | Great Britain | July 3, 1957 |